US012687233B2

(12) United States Patent
Perthel

(10) Patent No.: US 12,687,233 B2
(45) Date of Patent: Jul. 21, 2026

(54) THERMALLY ACTIVATABLE PRESSURE RELIEF DEVICE

(71) Applicant: PTEC—PRESSURE TECHNOLOGY GMBH, Burscheid (DE)

(72) Inventor: Klaus Perthel, Burscheid (DE)

(73) Assignee: PTEC—PRESSURE TECHNOLOGY GMBH, Burscheid (DE)

( * ) Notice: Subject to any disclaimer, the term of this patent is extended or adjusted under 35 U.S.C. 154(b) by 647 days.

(21) Appl. No.: 18/015,735

(22) PCT Filed: Jul. 9, 2021

(86) PCT No.: PCT/EP2021/069107
§ 371 (c)(1),
(2) Date: Jan. 12, 2023

(87) PCT Pub. No.: WO2022/013080
PCT Pub. Date: Jan. 20, 2022

(65) Prior Publication Data
US 2023/0332707 A1 Oct. 19, 2023

(30) Foreign Application Priority Data
Jul. 17, 2020 (DE) ......................... 102020119022.0

(51) Int. Cl.
*F16K 17/38* (2006.01)
*A62C 37/14* (2006.01)

(52) U.S. Cl.
CPC .............. *F16K 17/38* (2013.01); *A62C 37/14* (2013.01)

(58) Field of Classification Search
CPC ......... Y10T 137/1797; Y10T 137/1963; F16K 17/38; F16K 17/383; A62C 37/14
See application file for complete search history.

(56) References Cited

U.S. PATENT DOCUMENTS 3,811,511 A 5/1974 McCulloch
4,739,835 A 4/1988 Polan et al.
(Continued)

FOREIGN PATENT DOCUMENTS

DE 2 227 404 A 12/1972
DE 202 10 704 U1 10/2002
(Continued)

OTHER PUBLICATIONS

PCT Application No. PCT/EP2021/069107, International Preliminary Report on Patentability (with English Translation), dated Jan. 26, 2023.

*Primary Examiner* — Jessica Cahill
(74) *Attorney, Agent, or Firm* — Westman, Champlin & Koehler, P.A.

(57) ABSTRACT

A thermally activatable pressure relief device includes a housing having an inlet passage and an outlet passage. A receiving cavity in the housing connects the inlet passage and the outlet passage. A blocking element provided in the receiving cavity. The blocking element is movable between a blocking position and a release position and blocking a fluid flow from the inlet passage to the outlet passage in the blocking position and is released in a release position. The pressure relief valve also includes and a support member, such as a bursting member, which holds the blocking element in the blocking position. The inlet passage opens transversely to the direction of movement of the blocking element in a side wall of the receiving cavity in the region of a mouth section which, in the blocking position, is filled by the blocking element.

19 Claims, 5 Drawing Sheets

(56)                    References Cited

U.S. PATENT DOCUMENTS

| | | | | |
|---|---|---|---|---|
| 5,511,576 | A * | 4/1996 | Borland | F16K 17/383 |
| | | | | 137/72 |
| 5,573,065 | A | 11/1996 | Sundholm | |
| 5,944,113 | A * | 8/1999 | Sundholm | A62C 37/14 |
| | | | | 169/37 |
| 6,367,499 | B2 * | 4/2002 | Taku | F17C 13/04 |
| | | | | 251/282 |
| 6,814,097 | B2 | 11/2004 | Girouard | |
| 7,814,925 | B2 * | 10/2010 | Nomichi | F16K 3/265 |
| | | | | 137/72 |
| 9,945,489 | B2 * | 4/2018 | Daido | F16K 17/383 |
| 10,000,318 | B2 * | 6/2018 | Groben | F15B 1/083 |
| 11,788,638 | B2 * | 10/2023 | Ham | F16K 17/383 |
| | | | | 137/74 |
| 12,345,378 | B2 * | 7/2025 | Nam | F17C 13/12 |
| 2008/0217572 | A1 | 9/2008 | Job | |
| 2008/0276992 | A1 | 11/2008 | Nomichi et al. | |
| 2010/0193050 | A1 | 8/2010 | Job | |
| 2012/0211684 | A1 * | 8/2012 | Zlatintsis | F16K 17/38 |
| | | | | 374/188 |

FOREIGN PATENT DOCUMENTS

| | | | |
|---|---|---|---|
| DE | 10 2009 000 800 A1 | 8/2010 | |
| EP | 0 806 224 A2 | 11/1997 | |
| EP | 1 918 621 A1 | 5/2008 | |
| EP | 2 489 411 A1 | 8/2012 | |
| GB | 1 350 991 A | 4/1974 | |
| KR | 101577789 B1 | 12/2015 | |
| WO | WO 2015/071791 A1 | 5/2015 | |

* cited by examiner

THERMALLY ACTIVATABLE PRESSURE RELIEF DEVICE

CROSS-REFERENCE TO RELATED APPLICATIONS

This Application is a Section 371 National Stage Application of International Application No. PCT/EP2021/069107, filed Jul. 9, 2021 and published as WO 2022/013080 A1 on Jan. 20, 2022, in German. The PCT Application No. PCT/EP2021/069107 claims the benefit of priority from German Patent Application No. DE 10 2020 119 022.0 filed on Jul. 17, 2020, in German.

TECHNICAL FIELD

The system described herein relates to a thermally activatable pressure relief device with a support member.

BACKGROUND

Thermally activatable pressure relief devices are regularly used in combination with shut-off valves for safely closing pressurized fluid accumulators. The thermally activatable pressure relief device serves as a safety device to prevent a severe pressure increase in a fluid accumulator due to thermally induced expansion of the fluid by discharging the fluid at a predefined temperature into the environment. Also known are pressure relief devices of fire extinguishing systems that automatically release extinguishing agent at a certain temperature.

The automatic release of the fluid is achieved by a temperature-sensitive support member that changes its shape at a predefined temperature, thereby enabling displacement of a blocking element that opens a connecting passage between the fluid reservoir and the environment. For example, the temperature-sensitive support member may be a fusible member that melts above a predefined temperature. In another example, the support member is a thermoplastic body that softens above a predefined temperature. Also known are support members made of a shape memory alloy that has a transformation temperature at a predefined temperature, wherein the support member changes shape when the transformation temperature is exceeded. In some embodiments, the temperature-sensitive support member is a bursting member that bursts above a predefined temperature, thereby allowing displacement of the blocking element.

A bursting member in particular reacts sensitively to mechanical stress. In these designs, alternating stress occasionally leads to damaging the bursting member and, as a result of the damage, to undesired triggering of the thermally activatable pressure relief device.

This problem is known from the prior art. For example, a safety device for an extinguishing agent container with a closing member and a bursting member is known from utility model DE 202 10 704 U1, in which the bursting member rests against a shaped part which is supported by a spring assembly. The support using a helical compression spring serves to protect against accidental triggering of the safety device and to compensate for the length tolerance. If, on the other hand, the bursting member bursts due to an increased ambient temperature, this releases the blocking element (closing member).

DE 10 2009 000 800 A1 also describes a safety device for a pressurized gas container with a thermal release device that includes a bursting member mounted at one end on a support having claw-shaped spring arms on its circumference. As a result, the bursting member is supported in such a way that an offset of the axes, different temperature expansions and component tolerances can be compensated and vibration excitations can be dampened.

The flexible supports of the prior art can reduce the dynamic loads on the supporting members. The supported static forces, on the other hand, continue to be absorbed by the support member.

EP 1 918 621 A1 also shows a safety device for a pressurized gas container with an inlet passage leading axially to the blocking member and connected to the pressurized gas container, and an outlet passage leading radially away from the blocking member.

SUMMARY OF THE INVENTION

The underlying problem of the system described herein is to provide a pressure relief device which can be thermally activated and in which the forces acting on the support or bursting member are reduced.

The thermally activatable pressure relief device described herein includes a housing having at least one inlet passage and at least one outlet passage. The housing defines the external shape of the pressure relief device and includes a mechanism that connects the pressure relief device to a fluid-carrying system, such as a fluid reservoir or a fluid-carrying conduit system. In a practical embodiment, the fluid reservoir may be, for example, a pressurized gas reservoir, or a fluid reservoir. A fluid-carrying conduit system may be, for example, the water supply of a fire extinguishing system. For connecting the pressure relief device to the fluid-carrying system, a sealed thread or a sealed plug-in connection may be provided in the region of the inlet passage, for example. Of course, other connection devices can also be used.

Fluid from the fluid-carrying system is supplied to the pressure relief device via the inlet passage.

The fluid can be discharged into the environment via the at least one outlet passage arranged in the housing of the pressure relief device.

The inlet passage and the outlet passage are connected via a receiving cavity arranged in the housing. A blocking element is arranged in the receiving cavity, which can be moved between a blocking position and a release position. The blocking element, located in the blocking position, blocks a flow of a fluid from the inlet passage to the outlet passage. In other words, in the blocking position, the blocking element blocks the passage of fluid toward the outlet passage so that the fluid-carrying system is sealed. Thus, the pressure relief device is closed in a first configuration in which the blocking element is in the blocking position.

Due to the receiving cavity sealed by the blocking element, the pressure relief device has a high-pressure area and a low-pressure area in the closed state. The high-pressure area includes the inlet passage and the adjacent fluid-carrying area up to a seal that interacts with the blocking element. The seal delimits the high-pressure region from the low-pressure region. The low pressure area is the area of the pressure relief device on the other side of the seal. In the closed configuration, in which the blocking element is arranged in the blocking position, the blocking element is supported against a support member or bursting member that prevents displacement of the blocking element and holds the blocking element in the blocking position.

Due to the temperature-related change in shape of the support member, in the case of a bursting member due to bursting at a predefined temperature, the blocking element is released and is no longer fixed relative to the housing. The blocking element can be moved in a direction of movement from the blocking position to the release position. In the release position, the passage of the fluid from the inlet passage to the outlet passage is released and the fluid can flow out through the outlet passage.

In the pressure relief device described here, the inlet passage arranged in the housing opens transversely to the direction of movement of the blocking element in a side wall of the receiving cavity in the region of a mouth section which is filled by the blocking element in the blocking position.

The configuration described herein has the advantage that the fluid flows essentially in a radial direction towards the blocking element. In prior art devices, the inflow of fluid from the inlet passage is axial to the blocking element, i.e. in the direction of movement of the blocking element, so that the entire end face of the blocking element is subjected to the high pressure of the inflowing fluid. The application of high pressure to the large end face of the blocking element results in a large force in the direction of movement of the blocking element, which must be held and supported by the support member. In contrast, the inflow of the high-pressure fluid in the device described here is radial. A force generated by the high pressure therefore also acts primarily radially and thus not in the direction of movement of the blocking element. The radially acting force is absorbed by the housing and not by the support member, which supports the blocking element in the direction of movement. In the case of a rotationally symmetrical blocking element, the radial force can be completely cancelled out by suitable design of the sealing arrangement. The axial force in the direction of movement can also be completely eliminated or limited to a desired amount.

The orientation of the mouth of the inlet passage transverse to the direction of movement of the blocking element can mean either an orientation of the mouth of the inlet passage at right angles to the direction of movement or an orientation of the mouth of the inlet passage with an inclination of the longitudinal axis of the inlet passage to the direction of movement. The inclination may be from 30° to 90°, preferably 60° to 90°, with respect to the direction in which the blocking element is moved.

In the blocking position of the blocking element, the mouth section is sealed off from the end faces at the axial ends of the blocking element in the direction of movement of the blocking element.

In some embodiments, the receiving cavity for the bocking element can be a bore and the bocking element can be a shut-off piston, in particular a cylindrical shut-off piston. The bore with a circular cross-section and the cylindrical shut-off piston are easy to manufacture and seal. In this case, the inflowing fluid can be directed radially to the shut-off piston. Also, the inlet passage and the outlet passage can each be a bore. In some embodiments, the receiving cavity with axially adjoining outlet passage can be a first bore and the inlet passage a second bore extending transversely thereto.

In some embodiments, the pressure relief device may include an arrangement for generating a force acting in the direction of movement. In a first embodiment, the force may be generated by a preloaded compression spring that pushes the blocking element toward the release position. One end of the compression spring is supported against the housing and the other end of the compression spring is supported against the blocking element. When the support member (bursting member) releases the movement of the blocking element, the compression spring pushes the blocking element into the release position and the fluid can escape from the outlet passage.

In the spring-driven blocking element described herein, the mouth section of the inlet passage can be sealed directly against the surface of the blocking element. The pressure of the fluid in the inlet passage then presses the blocking element against the housing wall opposite the inlet passage.

The blocking element can also be sealed off from the receiving cavity using two sealing rings (O-rings). In this embodiment, the blocking element can be cylindrical. Two sealing rings are arranged on a surface of the blocking element, which are supported against the inner surface of the receiving cavity, which has the shape of a circular bore. The two sealing rings are spaced apart in the axial direction of movement of the blocking element. The mouth of the inlet passage lies between the sealing rings, so that the mouth section extending from the first sealing ring to the second sealing ring forms the high-pressure area. In the blocking position of the blocking element, the two sealing rings seal off the mouth section from the end faces of the blocking element.

Low pressure prevails outside the sealing rings. If the diameter of the blocking element is the same in the regions of the sealing rings, the same axial force acts on the blocking element in the opposite directions towards the two end faces of the blocking element. In this case, the axial forces cancel each other out and no axial force is generated in the direction of movement of the blocking element due to the pressure of the fluid.

In an embodiment, the blocking element can have a different diameter in the region of the first sealing ring than in the region of the second sealing ring. The force acting on the blocking element in the axial direction depends on the pressure in the high-pressure area between the sealing rings and on an effective surface via which the fluid on the high-pressure side of the sealing ring generates a force on the blocking element. If the effective area on the sealing ring near the support member or the bursting member is larger than on the sealing ring farther away from the support member or bursting member, a force is generated that presses the blocking element toward the support member in the direction of movement.

In an embodiment, the support member may be a closed glass bulb forming a bursting member and filled with a fluid that expands with an increase in temperature. The design of the bursting member and the pressure acting on the bursting member by the fluid contained in the bursting member are matched so that the pressure of the fluid contained in the bursting member, which expands with an increase in temperature, causes the bursting member to burst at a predefined temperature. In other words, the bursting member bursts at a certain temperature. The blocking element is then pressed toward the bursting member into the release position by the force of the compression spring or by the force due to the fluid in the high-pressure area, or by a combination of both forces.

The pressure relief device may further include an intermediate element which is arranged in the housing between the blocking element and the bursting member and which serves to transmit a force from the blocking element to the bursting member. The intermediate element bears with one end against the intact bursting member. With its other end, the intermediate element holds the blocking element in its blocking position when the bursting member is intact. The intermediate element can also have a mount for a compression spring that presses the intermediate element towards the bursting member. When the bursting member bursts, the compression spring presses the intermediate element into the area previously filled by the bursting member. The blocking element can, for example, protrude into an opening in the intermediate element and be frictionally connected to the intermediate element, so that the blocking element can only be released from the intermediate element with considerable force. In this case, the intermediate element takes the blocking element along into the open position when the blocking element is pressed by the compression spring into the area that was previously filled by the bursting member.

The outlet passage and the receiving cavity can have any orientation relative to each other. As mentioned, the outlet passage can be a bore. A coaxial orientation of the bores of the outlet passage and the bore of the receiving cavity is advantageous. It is particularly advantageous if the bore of the outlet passage and the bore of the receiving cavity have a common longitudinal axis and the outlet passage is oriented in a direction opposite to the direction of movement of the blocking element. The blocking element moves in the axial direction in the direction of movement from the blocking position to the release position, in which the blocking element is located substantially in the region in which the support member/bursting member was previously. The outlet passage is located at the end of the blocking element remote from the support member/bursting member, so that the fluid can flow out unhindered here.

BRIEF DESCRIPTION OF DRAWINGS

Further practical embodiments and advantages of the system described herein are described below in connection with the drawings.

DESCRIPTION OF VARIOUS EMBODIMENTS

Figure 1:
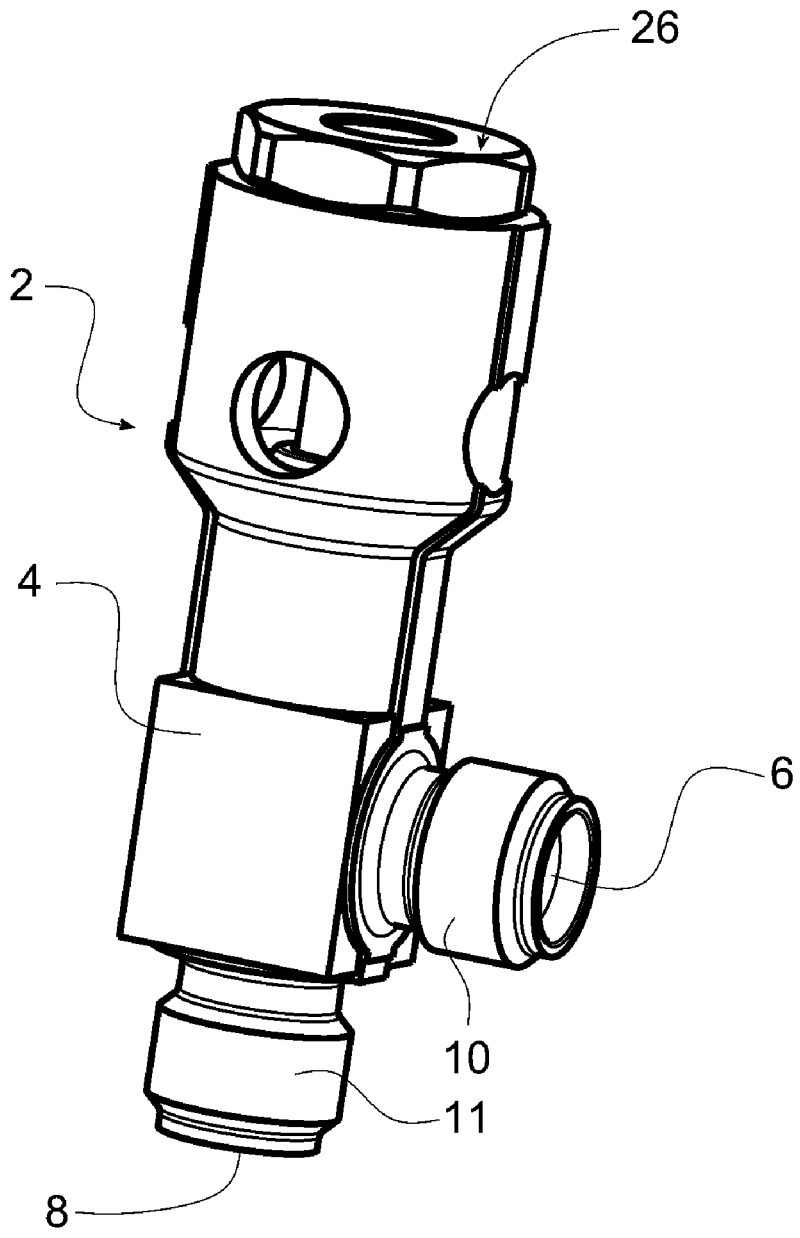
FIG. 1 is a perspective side view of a pressure relief device according to the system described herein.
Figure 2:
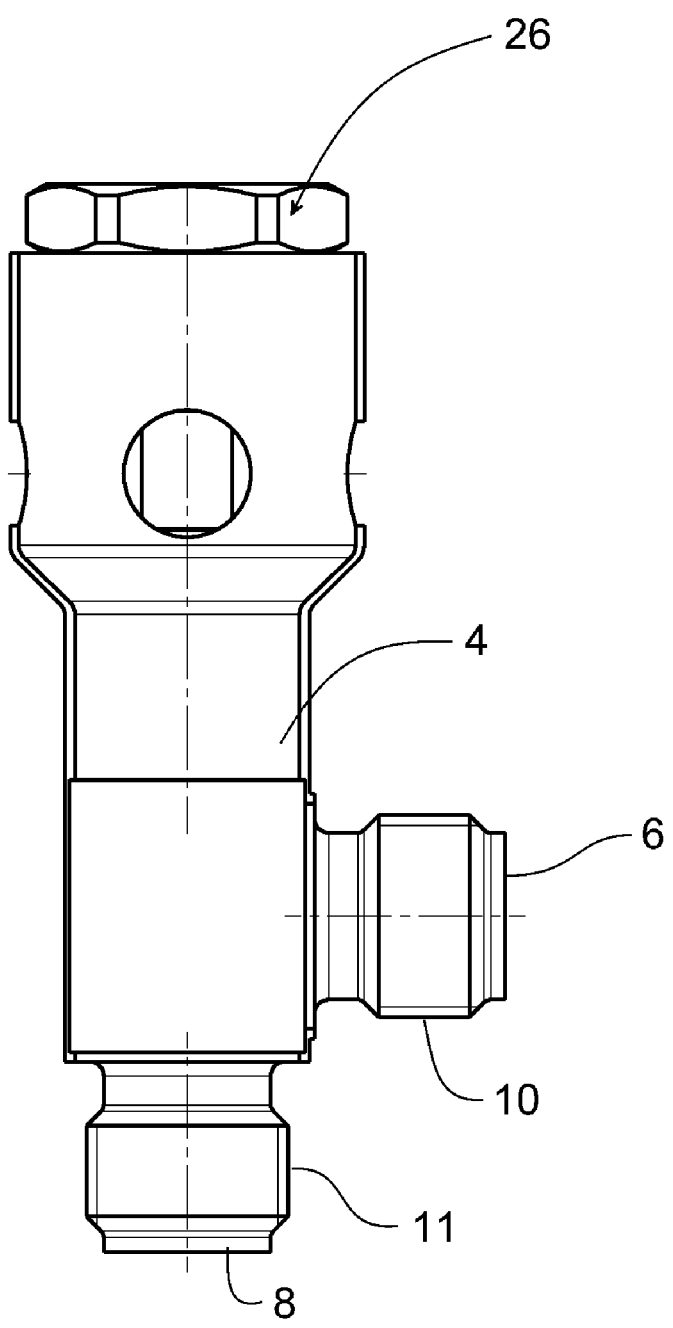
FIG. 2 is a side view of the pressure relief device of FIG. 1.
Figure 3:
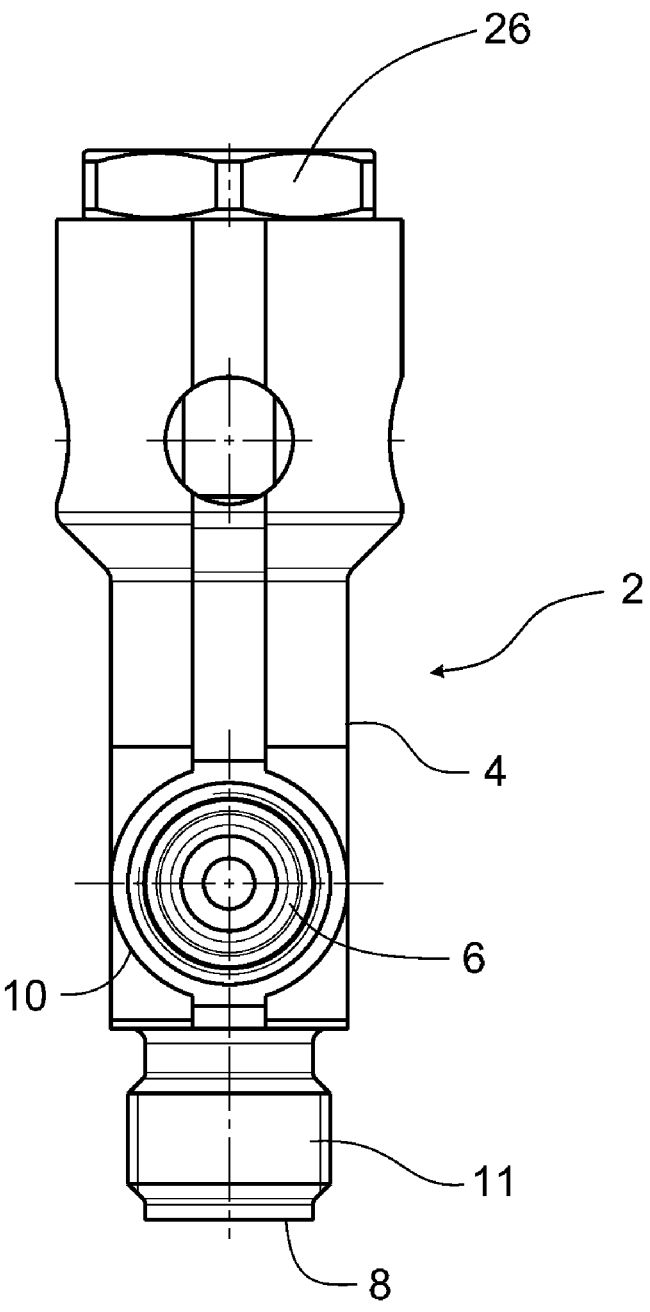
FIG. 3 is a front view of the pressure relief device of FIG. 1 looking into the inlet passage.

The thermally activatable pressure relief device 2 shown in the figures includes a housing 4 having an inlet passage 6 and an outlet passage 8. The housing 4 also has a thread 10 arranged at the inlet passage for connecting the pressure relief device 2 to a fluid-carrying system, for example a compressed gas container (not shown). A thread 11 is also arranged at the outlet passage 8 in the illustrated embodiment, to which a fluid conduit can be connected if the exiting fluid can be directed from the outlet passage to another location. If the exiting fluid can exit directly at the housing 4, the thread 11 can be omitted.

A receiving cavity 12 (FIGS. 4 and 5) is arranged in the housing between the inlet passage 6 and the outlet passage 8. The housing 4 is an elongated component with an axially extending bore, which has several successive sections. The central section of the bore forms the receiving cavity 12 for a blocking element, namely a shut-off piston 14. The inlet passage 6 opens into the receiving cavity 12 in the radial direction. The outlet passage 8 is axially adjacent to the receiving cavity 12 with the blocking element 14. In addition to the blocking element 14, a bursting member 16, an intermediate element 18 and a compression spring 20 are also arranged in the receiving cavity 12. An axial end of the receiving cavity 12, which is located at the top in the figures, is closed by a closing plug 26. The closing plug 26 has an external thread on a circumferential surface of the closing plug 26, which is screwed into an internal thread of the housing 4.

The receiving cavity 12 forms an elongated, substantially rotationally symmetrical recess in the housing 4. The outlet passage 8 and the receiving cavity 12 are aligned with each other and thus have a common longitudinal axis.

The inlet passage 6 and the receiving cavity 12 are oriented transversely to each other. The inlet passage 6 opens into a side wall of the receiving cavity 12 in such a way that the longitudinal axis of the inlet passage 6 and the longitudinal axis of the receiving cavity 12 are orthogonal to each other. The region of the receiving cavity 12 at which the inlet passage 6 opens forms a mouth section 34 for the inlet passage 6 and has a slightly larger diameter than adjacent regions of the receiving cavity 12. A fluid (not shown) is supplied to the receiving cavity 12 from the inlet passage 6 via the mouth section 34. When the pressure relief device 2 is closed, the mouth section 34 is bounded in the direction of the longitudinal axis of the receiving cavity 12 by two seals. In the illustrated embodiment, the seals are two O-rings 22 and 23, which are arranged between the blocking element 14 and the inner surface of the receiving cavity 12 and are axially spaced apart.

The blocking element 14 is designed as a rotationally symmetrical shut-off piston which is arranged in the receiving cavity 12 such that the blocking element 14 can be displaced in the longitudinal direction. The blocking element 14 has three portions when viewed in the longitudinal direction. A first end portion 28 is oriented toward the bursting member 16, upwardly in the drawings. A second end portion 30 is on the side of the blocking element 14 facing away from the bursting member 16 and forms a downward end in the drawings. A third, middle portion 32 is located between the first and second portions of the blocking element 14.

The first end portion 28 is provided with an external thread in the upper region and is screwed into an internal thread of the intermediate element 18. As a result, the blocking element 14 is fixed to the intermediate element 18 in the axial direction. Adjacent to the external thread is a threadless region of the first end portion 28, which has a reduced diameter relative to the middle portion 32. An upper sealing ring 22 is supported on the unthreaded portion of the first end portion 28. A first spacer sleeve 21 is located between the upper sealing ring 22 and the intermediate element 18. The second end portion 30 is also provided with an external thread onto which a threaded sleeve 33 is screwed. Here, too, the external thread is adjoined by a threadless region of the second end portion 30 of reduced diameter, on which a lower sealing ring 23 is mounted. A further spacer sleeve 25 is arranged between the lower sealing ring and the threaded sleeve 33.

For assembly, the two sealing rings 22, 23 and the spacer sleeves 21, 25 are pushed onto the end portions 28, 30 on the shut-off piston 14. Then the threaded sleeve 33 is screwed onto the lower end portion 30 and the intermediate element 18 is screwed onto the upper end portion 28. The unit thus formed can then be inserted into the bore of the housing 4, which forms the receiving cavity. The shut-off piston 14 is fixed to the intermediate element 18 in the axial direction.

In the embodiment of the accompanying drawings, the cross-sectional area of the first end portion 28 of the blocking element 14 and the cross-sectional area of the second end portion 30 of the blocking element 14 along the longitudinal axis are approximately similar. The third, middle portion 32 has a larger diameter than the first end portion 28 and the second end portion 30 of the blocking element 14. The middle portion 32 is located in the mouth section 34 of the receiving cavity 12 when the blocking element 14 is in the blocking position shown in FIG. 4. The first end portion 28 and the second end portion 30 of the blocking element 14 have a slightly smaller diameter than the receiving cavity 12, so that an O-ring 22 and an O-ring 23, respectively, can be arranged between each of the end portions 28, 30 and the inner wall of the receiving cavity 12. The O-rings 22 seal the mouth portion 34 in a gas-tight manner with respect to the upper and lower regions of the receiving cavity 12, and thus in a gas-tight manner with respect to the upper and lower faces of the blocking element 14.

The mouth section 34 has a radial widening between the two O-rings 22, 23 into which the inlet passage 6 opens. In the entire mouth section 34 between the seals, i.e., the O-rings 22, 23, the pressure of the fluid in the inlet passage 6 prevails, which is usually considerably increased compared to the ambient pressure. Thus, a high-pressure region is created in the mouth section 34 and a low-pressure region beyond the O-rings 22, 23.

The hydrostatic pressure of the fluid in the high-pressure area within the mouth section 34 acts on the blocking element 14, which is in the blocking position, and generates forces via the surfaces of the blocking element 14. The force components of the pressure acting on the blocking element 14 in the radial direction cancel each other out due to rotational symmetry of the blocking element 14. The axial force components depend on the cross-sectional area of the blocking element 14 in the region of the seals, namely the O-rings 22 and 23. Although it is not readily apparent from the drawings, the diameter of the blocking element 14 may be slightly larger in the first, upper end portion 28 than in the second, lower end portion 30. Consequently, the upwardly acting fluid pressure forces in the high pressure mouth section 34 are greater than the downwardly acting pressure forces and the pressure forces push the blocking element 14 upwardly. However, the resulting and upwardly acting pressure forces are much smaller than in known embodiments in which the inlet passage leads to the end face of the blocking element and the high pressure is applied to the entire end face.

In the closed configuration of the pressure relief device 2 shown in FIG. 1, the blocking element 14 is supported against a first end of the intermediate element 18 on a first upper end face disposed on the first end portion 28 of the blocking element 14. The downwardly directed first end of the intermediate element 18 has a recess that engages the upper portion of the first end portion 28 of the blocking element 14. The recess at the first end of the intermediate element 18 has a diameter that is smaller than the diameter of the first end portion 28 of the blocking element 14, such that the intermediate element 18 is connected to the blocking element 14 by an interference fit in the embodiment shown herein.

A second, upper end of the intermediate element 18 supports the intermediate element 18 against the bursting member 16. The second end of the intermediate element 18 has a circumferential collar that is received with a small amount of clearance in the receiving cavity 12. The top of the second end of the intermediate element 18 includes a recess that receives the lower end of the bursting member 16.

In the embodiment shown herein, the bursting member 16 is an elongated rotationally symmetrical, thin-walled, closed glass bulb extending in the longitudinal direction of the receiving cavity 12. At the upper end of the bursting member 16 facing away from the intermediate element 18, the bursting member 16 has a nipple 24 which projects into a recess of a screw plug 26 which is screwed into an internal thread arranged at the upper end of the receiving cavity 12 and closes the housing 4. The bursting member 16 is held securely in position via the nipple 24 located in the recess.

Figure 4:
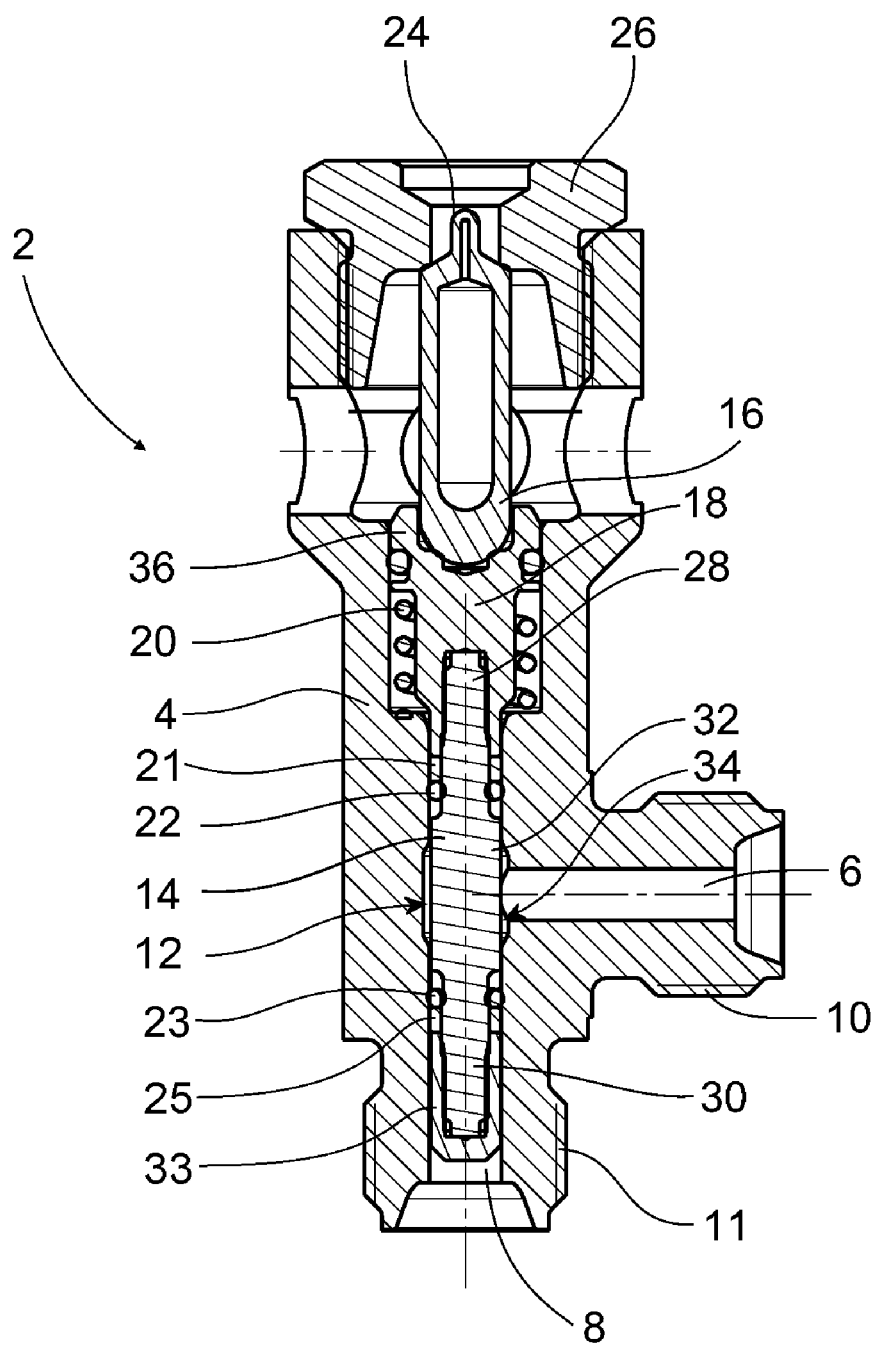
FIG. 4 is a sectional view of the pressure relief device from FIGS. 1-3 with the bursting member intact and the blocking element in the blocking position.

The bursting member 16, which is axially supported on the screw plug 26, fixes the blocking element 14 in a blocking position via the intermediate element 18, as is shown in FIG. 4.

The bursting member 16 contains a fluid, usually a liquid, which expands with an increase in temperature so that the pressure on the inner surface of the bursting member 16 increases. Radially around the bursting member, the receiving cavity 12 has a widening so that the lateral wall of the bursting member 16 is not in contact with the inner surface of the housing 4. Thus, the lateral wall of the bursting member 16 is not supported by the housing 4, and the pressure exerted on the lateral wall of the bursting member 16 by the fluid contained in the bursting member 16 causes the bursting member 16 to burst at a predetermined threshold temperature. Consequently, the bursting member 16 forms a support member for the blocking element 14 and prevents the blocking element 14 from being displaced in the axial direction. When bursting occurs due to reaching the threshold temperature, the bursting member releases the movement of the blocking element 14 in the axial direction and allows the fluid to flow from the inlet passage 6 to the outlet passage 8.

When the cross-sectional areas of the first end portion 28 and the second end portion 30 of the blocking element 14 are equal in size, no axial force acting longitudinally on the blocking element 14 is generated by the high pressure fluid flowing through the inlet passage 6. The pressure relief device includes a compression spring 20 which exerts an axial force on the intermediate element 18 in the direction of the bursting member 16. In the illustrated embodiment, the compression spring 20 is a helical spring that surrounds intermediate element 18. The compression spring 20 is preloaded and rests with a lower end on an annular shoulder surface in the receiving cavity 12 of the housing and with the other, upper end against the collar of the intermediate element 18. The preload of the compression spring 20 exerts an upward force on the bursting member via the intermediate element 18.

Figure 5:
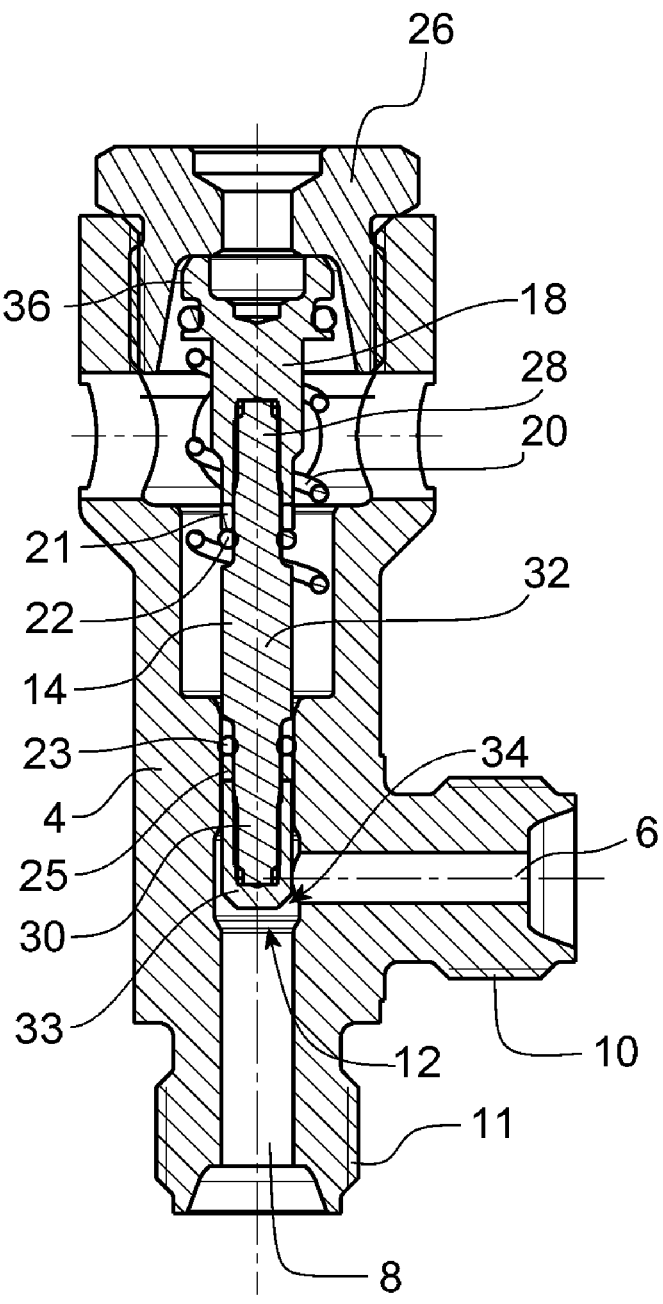
FIG. 5 is a sectional view corresponding to FIG. 4 with the blocking element in the release position.

In the first configuration of the thermally activatable pressure relief device 2 shown in FIG. 4, in which the bursting member 16 is intact, the blocking element 14 is in blocking position. The pressure relief device is in a standby state in which a flow of fluid from the inlet passage 6 to the outlet passage 8 is blocked. When the threshold temperature is exceeded, the bursting member 16 bursts, causing the intermediate element 18 and the blocking element 14 to no longer be supported against the bursting member 16. The preloaded compression spring 20 expands, moving the intermediate element 18 and the blocking element 14, held thereon by the aforementioned interference fit, to the release position. A second configuration of the pressure relief device 2 is shown in FIG. 5. It can be seen that the intermediate element 18 and the upper end portion 28 of the blocking element 14 are displaced upwards into the area where the intact bursting member 16 was previously located (see FIG. 4). By displacing the blocking element 14 with the sealing rings 22, 23 located thereon upwards, the outlet passage 8 is connected to the inlet passage 6 via the receiving cavity 12 so that a compressed gas supplied to the pressure relief device 2 via the inlet passage 6 can escape unhindered from the outlet passage 8.

In the illustrated embodiment, the downwardly extending outlet passage 8 is oriented opposite to the upwardly extending direction of movement of the blocking element 14 adjacent the receiving cavity 12. As a result, the gas flowing in through the inlet passage 6 can flow unhindered to the outlet passage 8 and escape without having to flow around the blocking element 14.

As mentioned above, the cross-sectional area of the first end portion 28 of the blocking element 14 is slightly larger than the cross-sectional area of the second end portion 30. The result is an upward driving force generated by the hydrostatic pressure of the fluid flowing through the inlet passage 6, pushing the blocking element 14 upward toward the bursting member 16. In this case, the magnitude of the driving force depends on the ratio of the size of the first cross-sectional area at the location where the first O-ring 22 is disposed at the first end portion 28 of the blocking element 14 to the size of the second cross-sectional area at the location where the second O-ring 23 is disposed at the second end portion 30 of the blocking element 14. Only the cross-sectional areas at the two end portions 28, 30 of the blocking element 14 and the pressure difference between the high-pressure region and the low-pressure region are relevant to the magnitude of the driving force. The magnitude of the driving force is significantly smaller than in the known devices in which the high pressure from the inlet passage is applied to the entire end face of the blocking element. The magnitude of the driving force can be selected so that the driving force promotes rapid opening of the pressure relief device but is not so great as to endanger the bursting member.

As noted, instead of the bursting member 16, other support members can be provided for the blocking element which change shape when a threshold temperature is exceeded, thereby releasing the movement of the blocking element 14.

The features of the invention disclosed in the present description, in the drawings as well as in the claims may be essential, both individually and in any combination, for the realization of the invention in its various embodiments. The invention is not limited to the embodiments described. It may be varied within the scope of the claims and with due regard to the knowledge of the person skilled in the art.

The invention claimed is:

1. A thermally activatable pressure relief device, comprising:

a housing having opposed first and second ends along a longitudinal axis, at least one inlet passage and at least one outlet passage, wherein the outlet passage is disposed at the first end of the housing;

a receiving cavity in the housing, which connects the inlet passage and the outlet passage and in which a blocking element is received, the blocking element being movable along the longitudinal axis between a blocking position and a release position, wherein the blocking element blocks a fluid flow from the inlet passage to the outlet passage in the blocking position and releases the fluid flow in the release position;

an intermediate element disposed between the blocking element and the second end of the housing;

a support member disposed between the intermediate element and the second end of the housing, wherein the support member holds the blocking element in the blocking position, and wherein the inlet passage opens transversely to a direction of movement of the blocking element from the blocking position to the release position; and a preloaded compression spring surrounding the intermediate element and configured to urge the blocking element in the direction of movement.

2. The thermally activatable pressure relief device according to claim 1, wherein the receiving cavity includes a first sealing ring and a second sealing ring, and wherein the sealing rings abut against an outer surface of the blocking element and an inner surface of the receiving cavity.

3. The thermally activatable pressure relief device according to claim 2, wherein the blocking element has a different diameter in a first region of the first sealing ring than in a second region of the second sealing ring.

4. The thermally activatable pressure relief device according to claim 2 comprising a spacer sleeve disposed around the blocking element adjacent the first or second sealing ring.

5. The thermally activatable pressure relief device according to claim 4, wherein the spacer sleeve abuts the intermediate element.

6. The thermally activatable pressure relief device according to claim 4, wherein the spacer sleeve abuts a threaded sleeve into which the blocking element protrudes.

7. The thermally activatable pressure relief device according to claim 1, wherein the support member is a bursting member.

8. The thermally activatable pressure relief device according to claim 1 wherein the receiving cavity is a first bore and the blocking element is a shut-off piston.

9. The thermally activatable pressure relief device according to claim 8, wherein the outlet passage is a second bore, and wherein the first and second bores are co-axial along the longitudinal axis.

10. The thermally activatable pressure relief device according to claim 1 wherein the direction of movement of the blocking element is toward the second end.

11. The thermally activatable pressure relief device according to claim 1, wherein the spring is supported on the housing and on the intermediate element.

12. The thermally activatable pressure relief device according to claim 1, wherein the intermediate element directly contacts the support member.

13. The thermally activatable pressure relief device according to claim 1, wherein the intermediate element directly contacts the blocking element.

14. The thermally activatable pressure relief device according to claim 1, wherein the direction of movement of the blocking element is configured to push the intermediate element into a location of the support member.

15. The thermally activatable pressure relief device according to claim 1, comprising a plug configured to close the second end of the housing.

16. The thermally activatable pressure relief device according to claim 1, wherein the intermediate element comprises an opening into which the blocking element protrudes.

17. The thermally activatable pressure relief device according to claim 1, wherein the intermediate element and the blocking element are attached to each other so that they move together in the direction of movement.

18. The thermally activatable pressure relief device according to claim 17, wherein the intermediate element and the blocking element are attached to each other with an interference fit.

19. The thermally activatable pressure relief device according to claim 17, wherein the intermediate element and the blocking element are attached to each other with a threaded connection.

\* \* \* \* \*